United States Patent [19]
Cloran et al.

[11] Patent Number: 5,950,822
[45] Date of Patent: Sep. 14, 1999

[54] DISC DISPLAY AND STORAGE DEVICE

[75] Inventors: Christopher L. Cloran, Lexington; Martin D. Seyer, Chapin, both of S.C.

[73] Assignee: @EAZE, LLC, Chapin, S.C.

[21] Appl. No.: 08/964,812

[22] Filed: Nov. 5, 1997

[51] Int. Cl.⁶ .................................................. B65D 85/57
[52] U.S. Cl. .................... 206/310; 206/308.1; 206/459.5
[58] Field of Search ........................ 206/308.1, 309–313, 206/387.1, 493, 232, 459.5

[56] References Cited

U.S. PATENT DOCUMENTS

| | | | |
|---|---|---|---|
| 4,700,839 | 10/1987 | Fujii | 206/309 |
| 4,948,022 | 8/1990 | VanDyke . | |
| 4,951,826 | 8/1990 | Tompkins . | |
| 5,052,564 | 10/1991 | Zuzack . | |
| 5,078,270 | 1/1992 | Campbell . | |
| 5,090,561 | 2/1992 | Spector . | |
| 5,249,677 | 10/1993 | Lim | 206/308.1 |
| 5,291,990 | 3/1994 | Sejzer . | |
| 5,299,186 | 3/1994 | Tsurushima . | |
| 5,427,236 | 6/1995 | Kramer | 206/310 |
| 5,476,173 | 12/1995 | Opresco . | |
| 5,494,156 | 2/1996 | Nies | 206/310 |
| 5,515,968 | 5/1996 | Taniyama | 206/310 |
| 5,520,307 | 5/1996 | Miller et al. | 206/459.5 |
| 5,533,614 | 7/1996 | Walker . | |
| 5,542,532 | 8/1996 | Nitchell | 206/308.1 |
| 5,590,827 | 1/1997 | Nimpoeno . | |
| 5,609,258 | 3/1997 | Spector . | |
| 5,626,225 | 5/1997 | Joyce, Jr. | 206/493 |
| 5,651,458 | 7/1997 | Brosmith et al. . | |
| 5,660,274 | 8/1997 | Chien | 206/308.1 |
| 5,685,424 | 11/1997 | Rozek et al. | 206/310 |
| 5,697,496 | 12/1997 | Bauer | 206/310 |
| 5,806,672 | 9/1998 | Bosworth | 206/310 |

*Primary Examiner*—Paul T. Sewell
*Assistant Examiner*—Luan K. Bui
*Attorney, Agent, or Firm*—Marshall, O'Toole, Gerstein, Murray & Borun

[57] ABSTRACT

A device for storing a compact disc includes a rigid base having a substantially planar rear surface and a center hub protruding from the front surface of the base for releasably engaging the disc. The device preferably has one or more areas for location of a design or decoration. A center hub for temporarily securing the disc to the device is also disclosed.

12 Claims, 4 Drawing Sheets

DISC DISPLAY AND STORAGE DEVICE

BACKGROUND OF THE INVENTION

1. Field of the Invention

The invention relates generally to a device for the display and storage of discs, and more particularly to a device for the display, storage, and mounting of compact discs.

2. Description of Related Technology

Differing types of compact discs can be used for storing large amounts of data readable by many types of apparatus. For example, an optically-readable disc can be used to store audio, visual, and digital (e.g., computer software) data. Examples of these discs are referred to as digital audio compact discs (CDs), digital video discs (DVDs), CD read-only-memory discs (CD-ROMs), and laser discs. These discs, which can be made in various sizes depending upon the apparatus in which they are to be used, may be referred to generally as optical discs or compact discs. Thus, as used herein, the terms disc and compact disc refer generically to all of the discs described herein.

Currently, most discs are shipped, sold, and stored in cumbersome protective cases commonly referred to as "jewel boxes." Although jewel boxes often perform well in protecting compact discs for shipment and storage, they suffer from many disadvantages. For example, jewel boxes are relatively heavy and large, considering the size of the discs they store. In addition, these boxes are difficult to open and to handle. In order to remove a disc from a jewel box, two hands are typically required, making it difficult to remove the compact disc, and especially difficult for a user to swap discs from one box to another. In addition, an environmental issue concerning the jewel boxes has been raised, particularly in the music industry, since the boxes incorporate a relatively large amount of plastic. The jewel boxes break quite easily and are then typically discarded and replaced. There is currently no satisfactory system set up for re-using or re-cycling these boxes. See U.S. Pat. No. 5,476,173.

Prior attempts at solving these problems have included providing containers that hold multiple jewel cases or have enclosures for multiple discs. However, these attempts have generally not solved the problems of inconvenience in handling and accessing the discs.

Other solutions have allowed the user to mount a rather large device that holds multiple discs on a wall or other large surface. See, for example, U.S. Pat. Nos. 5,090,561 and 5,533,614, the disclosures of which are hereby incorporated herein by reference. However, these solutions have not allowed the user to store and access discs conveniently in their work area, on their equipment (such as a stereo or computer hardware), or in other preferred areas.

SUMMARY OF THE INVENTION

It is an object of the invention to overcome one or more of the problems described above.

According to the invention, a disc display and storage device includes a rigid base with a protruding, center hub for releasably engaging the central hole of a disc. The base has a substantially planar rear surface. The device preferably has one or more areas for location of a design or decoration.

Other objects and advantages of the invention will be apparent to those skilled in the art from a review of the following detailed description, taken in conjunction with the appended claims.

DETAILED DESCRIPTION OF A PREFERRED EMBODIMENT

The invention provides a mountable device for the display and storage of optical discs including CDs, DVDs and CD-ROMs typically found in the music, video, and computer markets. The inventive device preferably provides convenient and efficient access, storage, display of a single compact disc.

Figure 1:
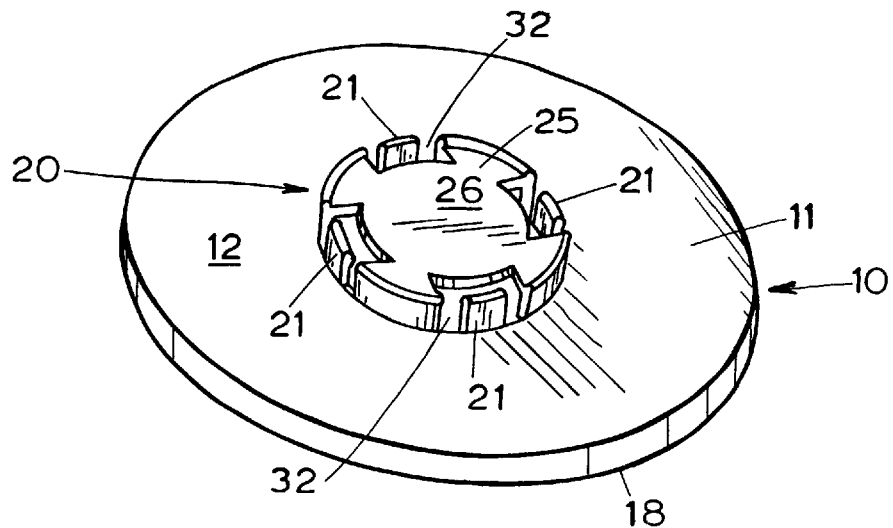
FIG. 1 is a perspective view of a device suitable for displaying a compact disc in accordance with the invention.
Figure 2:
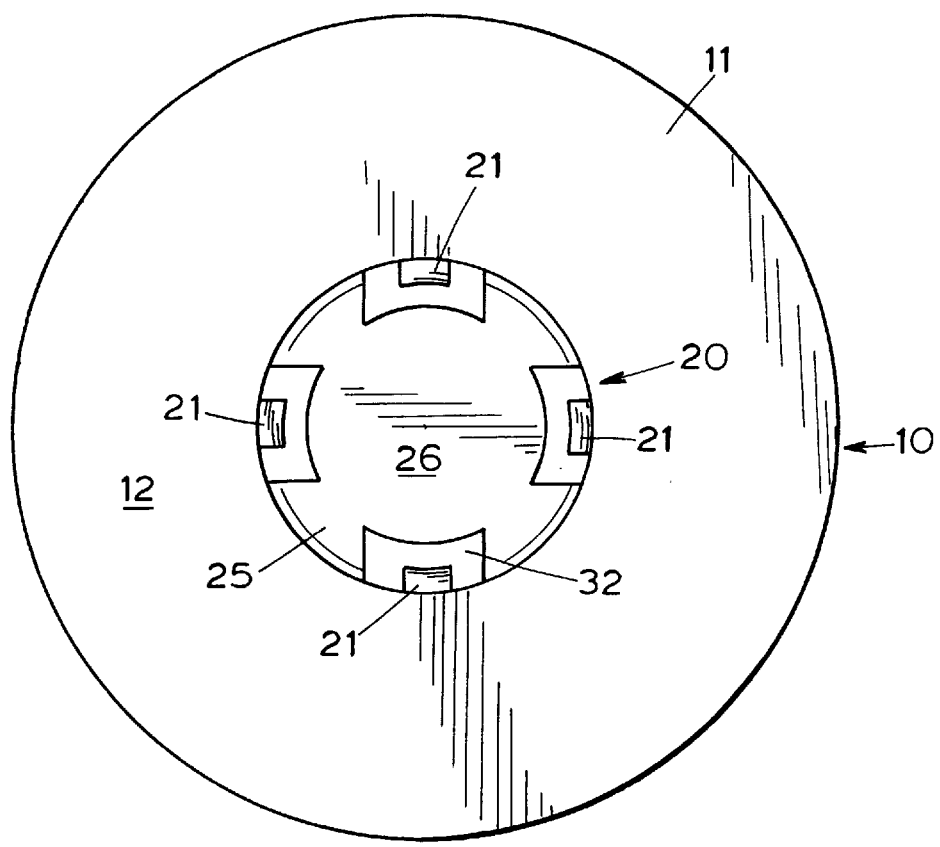
FIG. 2 is a top plan view of the device of FIG. 1.

Referring initially to FIGS. 1 and 2, a preferred embodiment of a disc storage device in accordance with the invention is indicated generally as element 10. The device 10 includes a base 11 having a top surface 12 and a bottom surface 13 (shown in FIG. 3). Adjacent to and raised from the surface 12 of the base 11 is a center hub indicated generally at 20. The center hub 20, which is described in greater detail below, generally includes a plurality of fingers or tabs 21 and a center portion 25. The center portion 25 has a top surface 26 and a bottom surface 27 (shown in FIG. 3).

Optionally, a flange, rim, or skirt 18 may extend down from an edge of the base 11. The skirt 18, which may have a height in a range of about 0.5 mm to about 4.0 mm, preferably about 1.0 mm to about 3.0 mm (e.g., about 2.0 mm), preferably provides additional rigidity to the device 10, and may also improve aesthetics and ease of manufacturing.

Figure 3:
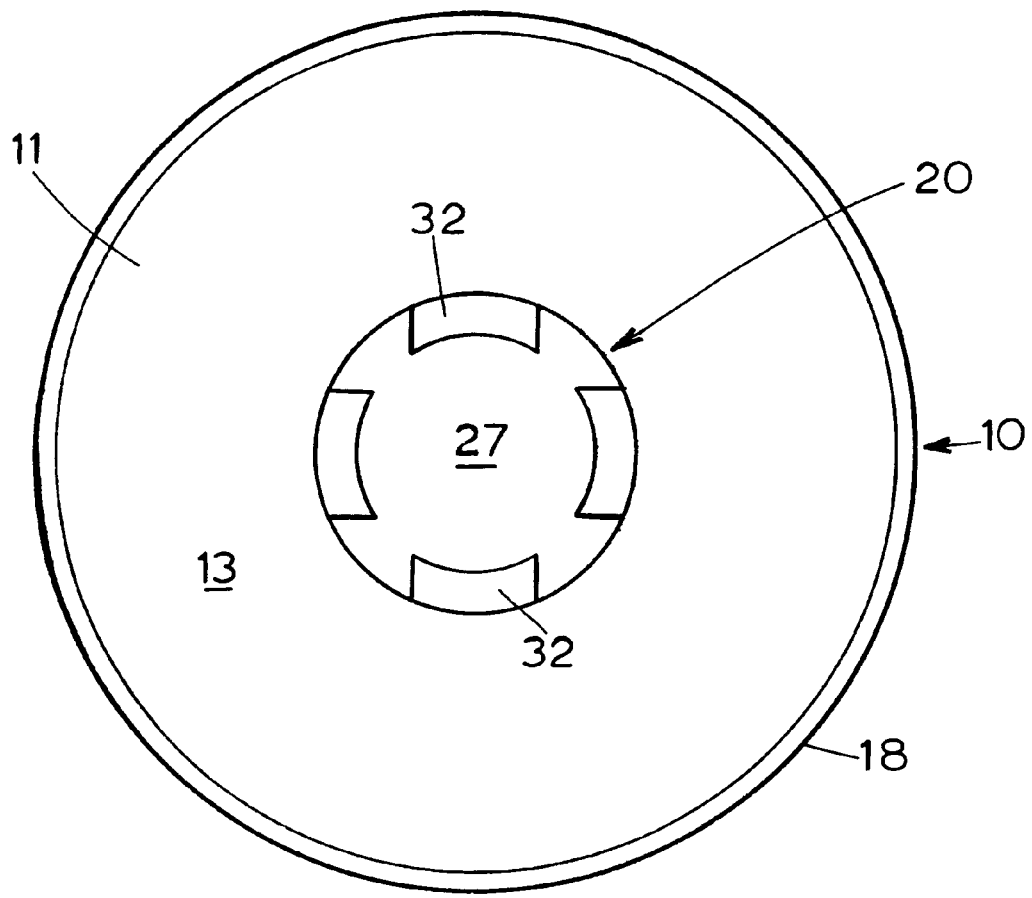
FIG. 3 is a bottom plan view of the device of FIG. 1.

FIG. 3 is a bottom view of the device 10 including the base 11 and the center hub 20. The base 11 has the bottom surface 13, while the center portion 25 of the hub has the bottom surface 27. Suitable expedients for attachment of the device 10 to another surface, such as a wall or other flat surface, may be associated with the bottom surface 13, as discussed below in more detail. As shown in the FIGS. 1–3, the base 11 is preferably a disc, however, this need not be the case. The base 11 can have other shapes, such as a square or rectangular plate, or a square or rectangular box.

Figure 4:
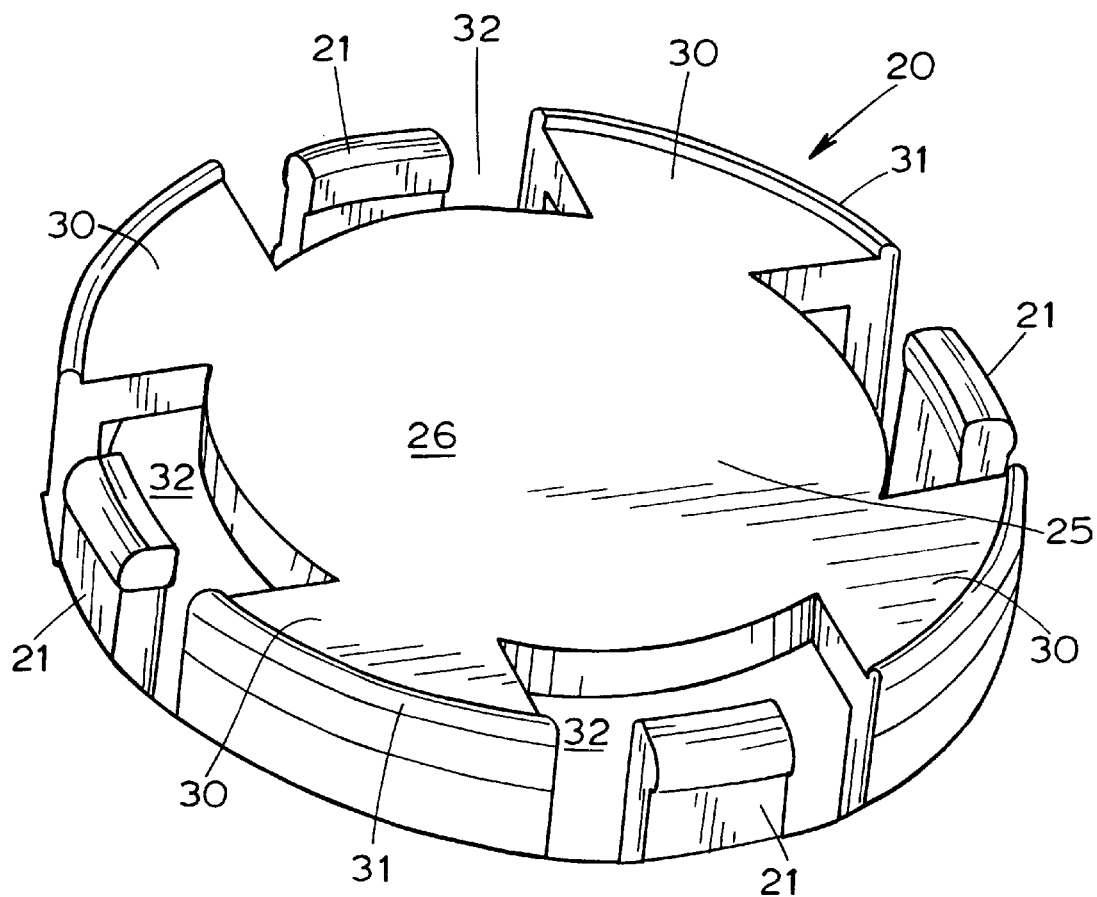
FIG. 4 is an enlarged perspective view of the center hub of the device of FIG. 1.

Referring to FIG. 4, the center hub 20 will now be described in more detail. The center hub 20 includes a plurality of the tabs 21 spaced from the center portion 25, as shown in FIGS. 1 and 2. The center portion 25 of the hub 20 has a plurality of arms 30 extending the full diameter of the center hub 20. In the preferred embodiment, there are four tabs 21 and four arms 30, however, the center hub 20 can easily be adapted to include a greater (e.g., 5–8) or lesser (e.g., two or three) number of tabs 21 and/or arms 30.

Around the periphery of the center portion 25 (at the arms 30), there may be a rim 31 having a top surface 33. The rim 31 preferably reduces exposure of a decoration, such as a decal, which is placed on the surface 26. In addition, the rim 31 may also facilitate placement of a compact disc onto the center hub 20. Spacing between the center portion 25 and the tabs 21 defines cutouts 32, which allow for flexing of the device 10, including deflection of the tabs 21, when a disc is pushed onto the center hub 20. In other embodiments, the cutouts 32 can have differing shapes, thereby defining differing shapes of arms 30.

The rim 31 may define the center hub 20 in cases where a center portion 25 is not present. In other words, if the rim 31 provides substantial rigidity to the device 10, the center hub 20 need not have a center portion 25 extending within the outline of the rim 31.

As described in greater detail below with regard to FIG. 5, as a compact disc having a center hole is placed onto the center hub 20 by the user, the flexible tabs 21 can be deflected (compressed momentarily inwardly), in order to facilitate placement of the center hub 20 into the center hole of the compact disc. The height of the center hub 20 (the shortest distance from the surface 12 to the top surface 33 of the rim 31) is preferably slightly greater than the thickness of any compact disc that is intended for use with the device 10. A digital audio compact disc typically measures about 1 mm in thickness, therefore the height of the center hub 20 is preferably in a range of about 1 mm to about 1.5 mm.

Figure 5:
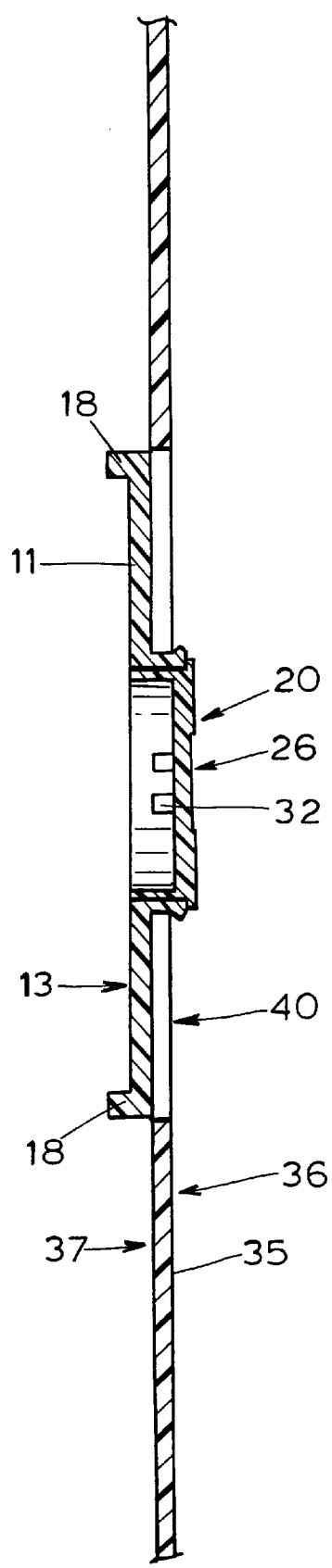
FIG. 5 is a cross sectional view of the device of FIG. 1, along with a temporarily secured compact disc illustrating a preferred application of the present invention.

Referring now to FIGS. 4 and 5, a compact disc 35 having a top surface 36 and a bottom surface 37 is releasably disposed on the device 10. The top surface 12 of the base 11 is the supporting surface for a portion of the bottom surface 37 of the compact disc 35. Preferably, the raised center hub 20 has a diameter that is slightly smaller than the center hole of the disc 35.

In order to place the disc 35 on the device 10, the center hole of the disc 35 is aligned over the raised center hub 20 and the disc 35 pressed down, causing the tabs 21 to flex or deflect inwardly toward the center of the hub 20 (into the cutouts 32). The tabs 21 move back to their original position once the center hole of the compact disc clears the center hub 20. The tabs 21 thereby provide substantial friction to hold the disc 35 in place on the center hub 20. Once the device is attached to a mounting surface, as described below, the device 10 functions as a permanent and/or temporary means of storing a compact disc 35. The base 11 of the device 10 spaces the compact disc 35 from the surface to which the device is attached, as shown in FIG. 5. This allows the user's fingers to grip the edges of the disc 35 for easy attachment and removal. Release of the disc is accomplished by applying a force to the edges of the disc effectively compressing the tabs 21 and releasing the disc 35 from the center hub 20.

The disc 35 can easily be both mounted onto the device 10 and removed with one hand. In this manner, the user has quick access to his or her favorite or most-used compact discs. This is of great advantage because most users of compact discs wish to be able to quickly obtain the compact disc with one hand.

The device 10 is preferably made of a rigid material that provides structural integrity sufficient to support the center hub 20, which is intended for repeated use. The material used for the device 10 can be any material that is capable of being molded, cut, extruded, or otherwise formed into one of the suitable shapes described herein. Examples of suitable materials include plastic, wood, metals, cardboard, paper, and other recycled materials. All of the elements of the device 10 are preferably integrally molded of plastic. However, less preferably, the elements might be manufactured independently and then secured together. A preferred method of manufacturing the device includes injection molding with a high molecular weight propylene copolymer plastic, which allows for ease of manufacture, while at the same time provide the final product with high rigidity and durability.

One substantial advantage of the invention is that the surfaces 12 and 26 provide a location for the placement of a design, decoration, or message. For example, customized marketing information, advertisement, company logo, telephone number, or other messages or designs can be placed on these surfaces. The design can be provided onto the surfaces 12 and 26 via a decal or sticker, or the design can be printed on the surface (e.g., thermal transfer printed), molded into the surface, or otherwise provided. An optional hole can be included in surface 26 (not shown), allowing for attachment of other styles of designs or decals, e.g., plastic snap-in pieces having a decal. Where the decoration is molded into the surfaces 12 and 26 with contours, the surface may still be considered substantially planar.

The decoration design can be provided onto the surfaces 12 and 26 prior to sale or distribution to the end user. Alternatively, the end user might desire to place his or her own customized decal on one or both of these surfaces 12 and 26. A kit may be provided so that the device 10 and a set of decals can be marketed together, so that the consumer can easily personalize the device 10.

In a preferred embodiment, the device 10 has a predetermined diameter (defined by the base 11) that substantially closely matches the standard size of a clear or translucent area 40 typically found near the center of many compact discs. This arrangement will provide a small, easy to use device, while allowing colors, messages, advertisements, etc. on the surface 12 to be visible even when a disc 35 is mounted on the device 10.

A standard digital audio compact disc typically measures about 120 mm in diameter, and may have a clear area in the shape of a circle having a diameter in a range of about 10 mm to about 60 mm, more specifically in a range of about 20 mm to about 50 mm, for example about 40 mm. Thus, the diameter of the device 10 is preferably about 60 mm or less, more preferably about 50 mm or less, and even more preferably about 40 mm or less, e.g. about 35 mm. The surface 12 preferably does not extend into the optically readable area of the compact disc 35 when the disc 35 is placed onto the device 10. So that the design or message is easily readable through this clear portion of the compact disc 35, the surface 12 is preferably substantially planar, in contrast to other holders, such as that disclosed in U.S. Pat. No. 5,299,186, the disclosure of which is hereby incorporated herein by reference.

In another embodiment, the tabs 21 can sit slightly lower than the surface 26 of the center hub 20, so that a decal can extend out over the tabs 21, increasing the space available on the surface 26 for a design, and covering as much of the hub 20 from view as possible. This embodiment is particularly suitable where a plastic snap-in decoration is used.

The inventive device can be used for securely holding and displaying various types of audio, visual, and digital rotating media formats, including CDs, DVDs, and CD-ROM formats. In addition, it is apparent that the device might be used not only for storage of compact discs, but with some adaptation, might be used to store similarly shaped items, such as circular saw blades, gears, and vinyl records, for example, as well as other audio, optical, and digital disc items.

Another advantage of the invention is that the device 10 can be attached to a multitude of surfaces, either indoors or outdoors, such as computer hardware, stereos, televisions, monitors, posters, walls, car dashboards, entertainment centers, printers, furniture, etc. Attachment to these surfaces may be achieved in a variety of manners, including chemical, mechanical, and magnetic expedients, such as adhesive paper or plastic tapes, double-sided foam tapes, liquid adhesives, magnets, and hook-and-loop fasteners (e.g., Velcro fasteners). The attachment is preferably not accomplished by holes through the device. Other suitable attachment means are available to those of skill in the art. The inventive storage device 10 allows the user to store a compact disc on just about any surface, thereby providing quick and convenient access to the compact disc 35.

The disc storage device described herein provides substantial flexibility for storing a single disc. Nevertheless, in view of the present disclosure those of skill in the art will be able to easily adapt the device to store multiple discs. For example, a dual disc display device could include two of the devices of FIG. 1 joined together by any suitable means, such as an arm molded integrally with two bases 11. Combinations of these devices, either attached or unattached, can be presented to form a pattern on a wall or other surface.

The inventive device can also be combined with other containers or enclosures to provide greater protection, flexibility, or storage capacity. The device can be included in original packaging for shipment and sale of compact discs. It is envisioned that manufacturers of compact discs could, with suitable accompanying packaging, substitute the inventive device for jewel boxes or other disc containers now used commercially. Computer software suppliers could include the device with software manuals or other documentation.

The invention can be incorporated into or with other products to aid the user in convenience of handling and storing the discs. Manufacturers of computers, televisions, monitors, and other apparatus could incorporate the inventive device into (or include the device with) their apparatus. For example, television and computer monitor manufacturers could incorporate the device into the monitor housing. Similarly, the device can be incorporated into a computer chassis or stereo equipment. Automobile manufactures could incorporate the device into dashboards, consoles, or glove boxes, for example.

The foregoing detailed description is given for clearness of understanding only, and no unnecessary limitations should be understood therefrom, as modifications within the scope of the invention will be apparent to those skilled in the art.

We claim:

1. A device for displaying a disc having a central hole, comprising:

(a) a rigid base having a substantially planar front surface;

(b) a circular center hub, protruding from said front surface of said base for releasably engaging said disc, said hub comprising:

at least two flexible tabs;

a center portion comprising (i) at least two integral, substantially rigid arms defining cutouts therebetween and (ii) a rim integral with said arms and protruding upwardly from said arms; and wherein said tabs are disposed in said cutouts.

2. The device of claim 1, wherein:

the base is a circular disc.

3. The device of claim 2, wherein:

the front surface of the base is substantially planar to provide substantially continuous contact thereof with a disc disposed on said device.

4. The device of claim 1, further comprising:

means for releasably attaching said device to a surface.

5. The device of claim 1, wherein:

the base is circular and has a diameter of about 60 mm or less.

6. The device of claim 1, wherein:

the base is circular and has a diameter of about 40 mm or less.

7. The device of claim 1, wherein:

said device is an integral molded piece.

8. The device of claim 1 wherein said planar surface of said base is devoid of an extension from the center hub.

9. The device of claim 1 wherein said planar surface of said base is devoid of slots.

10. The device of claim 1, further comprising adhesive tape for attaching said device to a surface.

11. The device of claim 1, further comprising a decoration disposed on said planar surface of said base.

12. A combination, comprising:

(a) the device of claim 1;

(b) a decorative sheet; and (c) a disc.

* * * * *